F. C. WARNE.
DISK SHARPENER.
APPLICATION FILED NOV. 9, 1914.

1,172,413.

Patented Feb. 22, 1916.

Witnesses
A. D. Schrader.
F. C. Adams

Inventor
FREDERICK C. WARNE
By Obed C. Billman
Attorney

THE COLUMBIA PLANOGRAPH CO., WASHINGTON, D. C.

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

DISK-SHARPENER.

1,172,413. Specification of Letters Patent. Patented Feb. 22, 1916.

Application filed November 9, 1914. Serial No. 870,983.

*To all whom it may concern:*

Be it known that I, FREDERICK C. WARNE, a citizen of the United States, residing at Mansfield, in the county of Richland and State of Ohio, have invented certain new and useful Improvements in Disk Sharpeners, of which the following is a specification.

My invention relates to improvements in disk sharpeners, the present embodiment being particularly designed and adapted for use in sharpening the disks commonly used on disk harrows without removing the disks from the gang.

The primary object of the invention is to provide a generally improved disk sharpener, of exceedingly simple and efficient construction which may be readily attached to or detached from an ordinary disk harrow and which when attached will sharpen the disk during the ordinary operation of the harrow or implement.

A still further object is the provision of improved attaching means whereby the improved disk sharpener may be readily attached to the various styles of disk harrows having a scraper bar carrying a series of depending disk cleaners or scrapers.

A further object is the provision of a disk sharpener that may be readily applied and used in connection with an implement of the above type without in any way interfering with the working parts during the ordinary operation of the same in the field, the improved device being adapted to be applied successively to the respective disks until sharpened to the requisite degree.

With the above mentioned and other objects in view, the invention consists in the novel construction, arrangement, and combination of parts, hereinafter described, illustrated in one of its embodiments in the accompanying drawings, and particularly pointed out in the appended claims.

Figure 1:
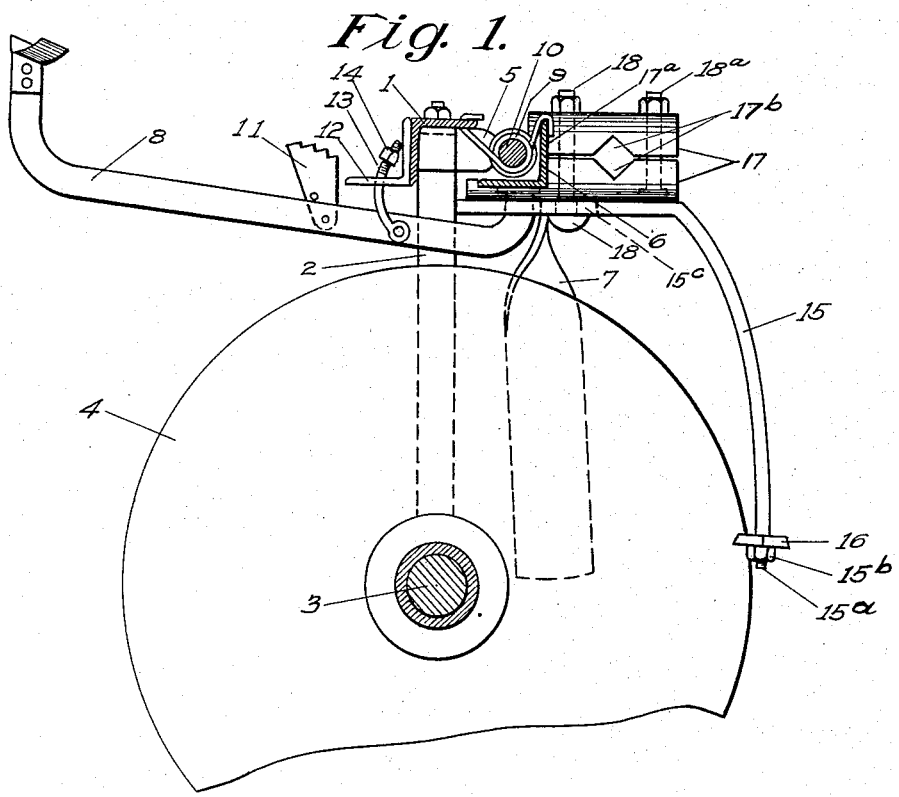

Referring to the drawings, forming a part of this specification, Figure 1, is a cross sectional view through a disk gang and gang frame, and a scraper carrying bar, the latter being equipped with the improved disk sharpener in its operative position for use.

Figure 2:
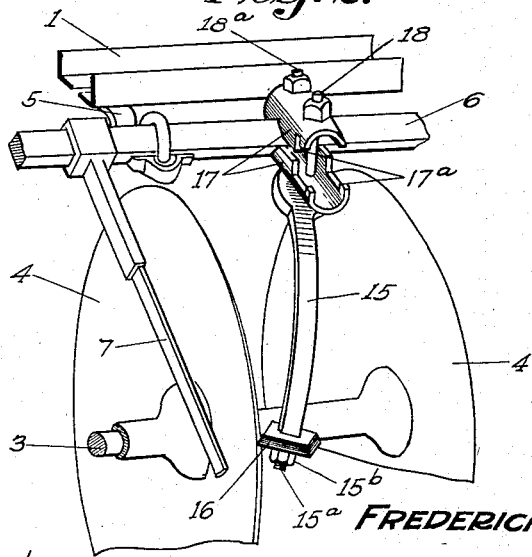

Fig. 2, a perspective view of the improved disk sharpener applied to a commonly employed scraper carrying bar of a disk harrow of a modified form of frame.

Similar numerals of reference designate like parts throughout all the figures of the drawings.

In the present embodiment of my invention I have shown the improved attachment or disk sharpener applied to a disk harrow of conventional form, said harrow embodying a suitable disk gang frame 1, provided with suitable standards 2, suitably connected to a gang axle 3, the latter carrying a series of disks 4. The frame 1, is provided with suitable bearing brackets 5, carrying a horizontally extending rotatably mounted scraper carrying bar 6, the latter being armed with a plurality or series of depending scrapers 7.

As a means of causing the lower or active ends of the scrapers 7, to be moved toward and from the peripheries of the disks 4, and toward and from the hub portions thereof to meet the varying demands of service, the scraper carrying bars 6, are usually provided with suitable actuating mechanism, such for example,—as a forwardly extending foot lever 8, as shown in Fig. 1 of the drawings whereby upon the actuation or depression of the foot lever 8, the bars 6, will be tilted or rotated thereby bringing the free ends of the scrapers 7, toward the periphery of the disks, and as a means of causing the scrapers 7, to be moved toward the axle or hub portions of the disks a coiled spring 9, is provided, one end of said coiled spring being suitably connected to the scraper carrying bars 6, to actuate the latter and the other end being suitably connected to some fixed portion of the gang frame 1. In the specific form of disk harrow shown in Fig. 1 the scraper carrying bar 6, is formed of angle iron and is mounted in the brackets 5, through the medium of a hinge pin 10, suitably connected to the bar 6, said hinge pin being surrounded by the spring 9.

As a means of holding the scraper carrying portion 6, and the scrapers 7, in their respective adjusted positions against the resistance of the springs 9, when adjusted through the medium of the lever 8, the latter may be provided with a notched pivotally mounted bracket 11, adapted to engage beneath the forwardly projecting bracket 12, on the member 1, and as a means of adjusting the throw or movements of the scraper 7, toward the outer peripheries of the disks 4, a curved pivotally mounted adjusting bolt 13, may be provided on the lever 8, said bolt extending upwardly through an opening in the bracket 12, and being provided with an adjusting nut 14, which latter will act as a stop against the bracket 12, when the foot lever is depressed.

Referring now to the improved attachment or disk sharpener, it will be observed that a tool carrying attaching arm 15, is provided, said arm 15, being provided at one end with a cutter tool or member 16, adapted to be brought into engagement with and to be maintained in engagement with the outer periphery or edge of the disk in the sharpening operation as hereinafter described.

The improved cutter 16, may be conveniently formed as shown, and, in the present instance attached to the arm 15, through the medium of a centrally located opening receiving and taking over a threaded shank 15$^a$, provided with attaching and securing nut 15$^b$, it being obvious that by this arrangement various sides of the cutter tool may be brought into engagement with the edge of the disk being sharpened.

As a means of conveniently attaching and clamping the tool carrying arm to such commonly employed scraper carrying bars 6, of the forms shown in Figs. 1 and 2 of the drawings, respectively, suitable clamping members or clips 17, are provided, said clips being provided at their forward ends with suitable recesses 17$^a$, corresponding in form to the form of the scraper carrying bars 6, shown in Fig. 1 of the drawings and being adapted to receive and contain, or in other words form a seat for, the angular bars 6, shown in said Fig. 1 of the drawings, and being adapted to be attached and held in position by means of the clamping bolts 18, and 18$^a$, the main clamping bolt 18, having an angular shaped head passing through a slot 15$^c$, in the head of the arm 15, and by means of which the latter may be adjusted.

As a means of adapting the clamps 17, for attachment to a scraper carrying bar 6, of the specific form shown in Fig. 2 of the drawings the clamping members or clips 17, are provided with angular shaped notches or recesses 17$^b$, conforming to and adapted to form the seat for the angular sides of the bar 6, as shown in Fig. 2 of the drawings, it being observed that in so attaching the clamping members 17, are simply loosened and swung upon the bolt 18, to a reversed position to that shown in Fig. 1 of the drawings.

When it is desired to bring the cutter 16, into active use for sharpening an adjacent disk as shown in the drawings the scraper carrying bar 6, is released by the scraper adjusting mechanism (as for example shown in Fig. 1) thereby bringing the spring 9, into active operation and thereby swinging the tool carrying attaching arm 15, toward the outer periphery of the adjacent disk 6, the tension of the springs 9, serving to maintain the cutter 16, in active cutting position against the disk as the latter is revolved during the ordinary operation of the disk harrow. When the disk is sufficiently sharpened the attachment may be readily adjusted on the bar 6, in proper position for sharpening the next or any other disk desired.

From the foregoing description, taken in connection with the accompanying drawings, the operation and advantages of my invention will be readily understood.

Having thus described one of the embodiments of my invention, what I claim and desire to secure by Letters Patent, is,—

1. In a disk sharpener, the combination with a disk implement provided with a spring resisted rotatably mounted scraper carrying bar, and means for moving said bar; of a cutter carrying arm detachably connected to said bar and adapted to bring the cutter into and out of operative engagement with one of the disks of said implement through the movements of said bar.

2. In a disk sharpener for a disk implement having a pivotally mounted spring resisted scraper carrying bar, means for moving said bar, and an attaching arm carried by said bar and provided with a tool adapted to engage and be held against the periphery of said disk by the action of said spring resisted bar.

3. In a disk sharpener, the combination with a disk implement including a pivotally mounted bar, a spring for resisting the movements of said bar on its pivot, and means for moving said bar against the resistance of said spring; of an attaching arm connected to said pivotally mounted bar and provided at its free end with a cutter tool adapted to be brought into and held in engagement with a disk when said bar is moved by the action of said spring and the release of said bar actuating means.

4. In a disk sharpener for disk harrows, the combination with a disk gang frame provided with a plurality of disks and a spring resisted pivotally mounted scraper carrying bar, and mechanism for actuating and adjusting said scraper bar against the resistance of said spring; of a depending attaching arm provided with adjustable clamps having recesses adapted to receive and clamp over said bar, and a cutter tool at the depending end of said attaching arm adapted to be brought into and held in engagement with the periphery of a disk when said scraper bar actuating and adjusting mechanism is released.

In testimony whereof I have affixed my signature in presence of two witnesses.

FREDERICK C. WARNE.

Witnesses:
C. A. HINES,
A. B. McLEAN.